United States Patent
Ishibashi

(10) Patent No.: US 12,386,712 B2
(45) Date of Patent: *Aug. 12, 2025

(54) STORAGE SYSTEM

(71) Applicant: Hitachi, Ltd., Tokyo (JP)

(72) Inventor: Kota Ishibashi, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 26 days.

This patent is subject to a terminal disclaimer.

(21) Appl. No.: 18/472,085

(22) Filed: Sep. 21, 2023

(65) Prior Publication Data

US 2024/0256401 A1  Aug. 1, 2024

(30) Foreign Application Priority Data

Jan. 31, 2023  (JP) ................. 2023-012912

(51) Int. Cl.
*G06F 11/07* (2006.01)
*G06F 11/14* (2006.01)

(52) U.S. Cl.
CPC .... *G06F 11/1469* (2013.01); *G06F 2201/865* (2013.01)

(58) Field of Classification Search
CPC .............. G06F 11/1469; G06F 2201/865
USPC .......................................... 714/15
See application file for complete search history.

(56) References Cited

U.S. PATENT DOCUMENTS

| | | | |
|---|---|---|---|
| 8,745,001 B1* | 6/2014 | Goldschmidt | G06F 11/1448 707/645 |
| 12,066,913 B2* | 8/2024 | Fukushima | G06F 11/0727 |
| 2005/0010617 A1* | 1/2005 | Chen | G06F 11/1417 |
| 2021/0224387 A1* | 7/2021 | Uragaki | H04N 1/00074 |
| 2022/0382533 A1* | 12/2022 | Kajimoto | G06F 11/1417 |

FOREIGN PATENT DOCUMENTS

JP   2012-022721 A   2/2012

* cited by examiner

*Primary Examiner* — Chae M Ko
(74) *Attorney, Agent, or Firm* — Foley & Lardner LLP

(57) ABSTRACT

A storage system is protected from tampering of software executed by the storage system. The storage system includes a first storage controller and a second storage controller. The first storage controller includes a first input and output controller configured to input and output host data, and a first management controller. The second storage controller includes a second input and output controller configured to input and output host data, and a second management controller. The first management controller is configured to store a backup of software of at least one of the second storage controller or the first input and output controller. A copy of tampered software of the at least one is stored. The tampered software of the at least one is recovered by the backup.

8 Claims, 12 Drawing Sheets

| Date | Device | Location ID | Backup Device | Backup Location ID |
|---|---|---|---|---|
| 2021/3/22 0:00:00 | MGC | 1 | MGC SSD | 1 |
| 2021/3/22 0:00:00 | DKC | 1 | DKC SSD | 1 |
| ... | ... | ... | ... | ... |

TAMPERED FIRMWARE STORAGE MANAGEMENT TABLE

| Device | Location ID | SW ver. |
|---|---|---|
| MGC | 1 | 88-01-06/00 |
| DKC | 1 | 88-01-04-00/00 |
| MGC | 2 | 88-01-06/00 |
| DKC | 2 | 88-01-04-00/00 |
| ... | ... | ... |

SOFTWARE INFORMATION TABLE

FIG. 5

CHECK RESULT MANAGEMENT TABLE (320)

| Date (321) | Device (322) | Location ID (323) | Result (324) |
|---|---|---|---|
| 2021/3/22 0:00:00 | MGC | 1 | OK |
| 2021/3/22 0:00:00 | DKC | 1 | OK |
| 2021/3/22 0:00:00 | MGC | 2 | OK |
| 2021/3/22 0:00:00 | DKC | 2 | OK |
| ... | ... | ... | ... |

FIG. 6

HEARTBEAT INFORMATION TABLE (330)

| Date (331) | MGC Location ID (332) |
|---|---|
| 2021/3/22 0:00:00 | 1 |
| 2021/3/22 0:00:00 | 2 |
| 2021/3/23 0:00:00 | 1 |
| 2021/3/23 0:00:00 | 2 |
| ... | ... |
| ... | ... |
| ... | ... |

FIG. 7

MONITORING TARGET MANAGEMENT TABLE (340)

| MGC ID (341) | DKC ID (342) | MGC ID (343) |
|---|---|---|
| 1 | 1 | 2 |
| 1 | 1 | 5 |
| ... | ... | ... |

FIG. 8

LOG MANAGEMENT TABLE (350)

| Date (351) | Event ID (352) | Event Name (353) | Severity (354) | Device (355) | Location ID (356) |
|---|---|---|---|---|---|
| 2021/3/22 01:30:50 | 53d5f29e-f351-46c3-bb9e-edd6e95a0c2f | The heartbeat has reconfirmed. | Info | MGC | 1 |
| 2021/3/5 18:15:22 | cfce5d6f-d5e9-433a-9bac-9d0e0b500b89 | The heartbeat has reconfirmed. | Info | MGC | 1 |
| ... | ... | ... | ... | ... | ... |
| ... | ... | ... | ... | ... | ... |
| ... | ... | ... | ... | ... | ... |

FIG. 9

REPORT RECORD MANAGEMENT TABLE (360)

| Date (361) | Event ID (362) | Event Name (363) | Severity (364) | Device (365) | Location ID (366) |
|---|---|---|---|---|---|
| 2021/3/22 01:30:50 | 3145d0b5-3f7c-462e-b31d-c973c6543a7a | FW has recoverd. | Error | DKC | 1 |
| ... | ... | ... | ... | ... | ... |
| ... | ... | ... | ... | ... | ... |

FIG. 10

TAMPERED FIRMWARE STORAGE MANAGEMENT TABLE (370)

| Date (371) | Device (372) | Location ID (373) | Backup Device (374) | Backup Location ID (375) |
|---|---|---|---|---|
| 2021/3/22 0:00:00 | MGC | 1 | MGC SSD | 1 |
| 2021/3/22 0:00:00 | DKC | 1 | DKC SSD | 1 |
| ... | ... | ... | ... | ... |

STORAGE SYSTEM

CLAIM OF PRIORITY

The present application claims priority from Japanese patent application JP 2023-012912 filed on Jan. 31, 2023, the content of which is hereby incorporated by reference into this application.

BACKGROUND OF THE INVENTION

1. Field of the Invention

The present invention relates to a storage system, and more specifically to inspection of software in the storage system.

2. Description of Related Art

Data storage is a basic function of a computer system. In many computer systems, when a large amount of data is handled, the data is stored in a storage apparatus. The storage system stores the data in a storage medium (storage drive) such as a hard disk drive (HDD) or a solid state drive (SSD), and writes and reads the data according to an instruction from an outside.

In recent years, it is important to conform to supply chain security, and a firmware tampering prevention function is implemented in servers. In addition, JP2012-022721A discloses a virus checker that checks virus infection for a file, and a technique of moving a file in which the virus infection is detected by the virus checker to a non-executable storage area in a storage apparatus (see, for example, Abstract).

CITATION LIST

Patent Literature

PTL 1: JP2012-022721A

SUMMARY OF THE INVENTION

A storage system that is required to continuously work at all times has a lower tolerance for reactivation of the system even when a fault occurs as compared with a server. This also applies to ensuring of a security level. It is required that the storage system operates while ensuring the security level in addition to I/O performance in related art. In addition, in the storage system, it is necessary to perform detailed cause analysis on and take countermeasures against tampering of firmware.

A storage system according to an aspect of the present disclosure includes a first storage controller and a second storage controller. The first storage controller includes a first input and output controller configured to input and output host data, and a first management controller. The second storage controller includes a second input and output controller configured to input and output host data, and a second management controller. The first management controller is configured to store a backup of software of at least one of the second storage controller or the first input and output controller. A copy of tampered software of the at least one is stored. The tampered software of the at least one is recovered by the backup.

According to an aspect of the present disclosure, a storage system can be protected from tampering of software executed by the storage system.

BRIEF DESCRIPTION OF THE DRAWINGS

FIG. 5 illustrates a configuration example of a check result management table;

FIG. 6 illustrates a configuration example of a heartbeat information table;

FIG. 7 illustrates a configuration example of a monitoring target management table;

FIG. 8 illustrates a configuration example of a log management table;

FIG. 9 illustrates a configuration example of a report record management table;

FIG. 10 illustrates a configuration example of a tampered firmware storage management table;

DESCRIPTION OF EMBODIMENTS

Figure 1:
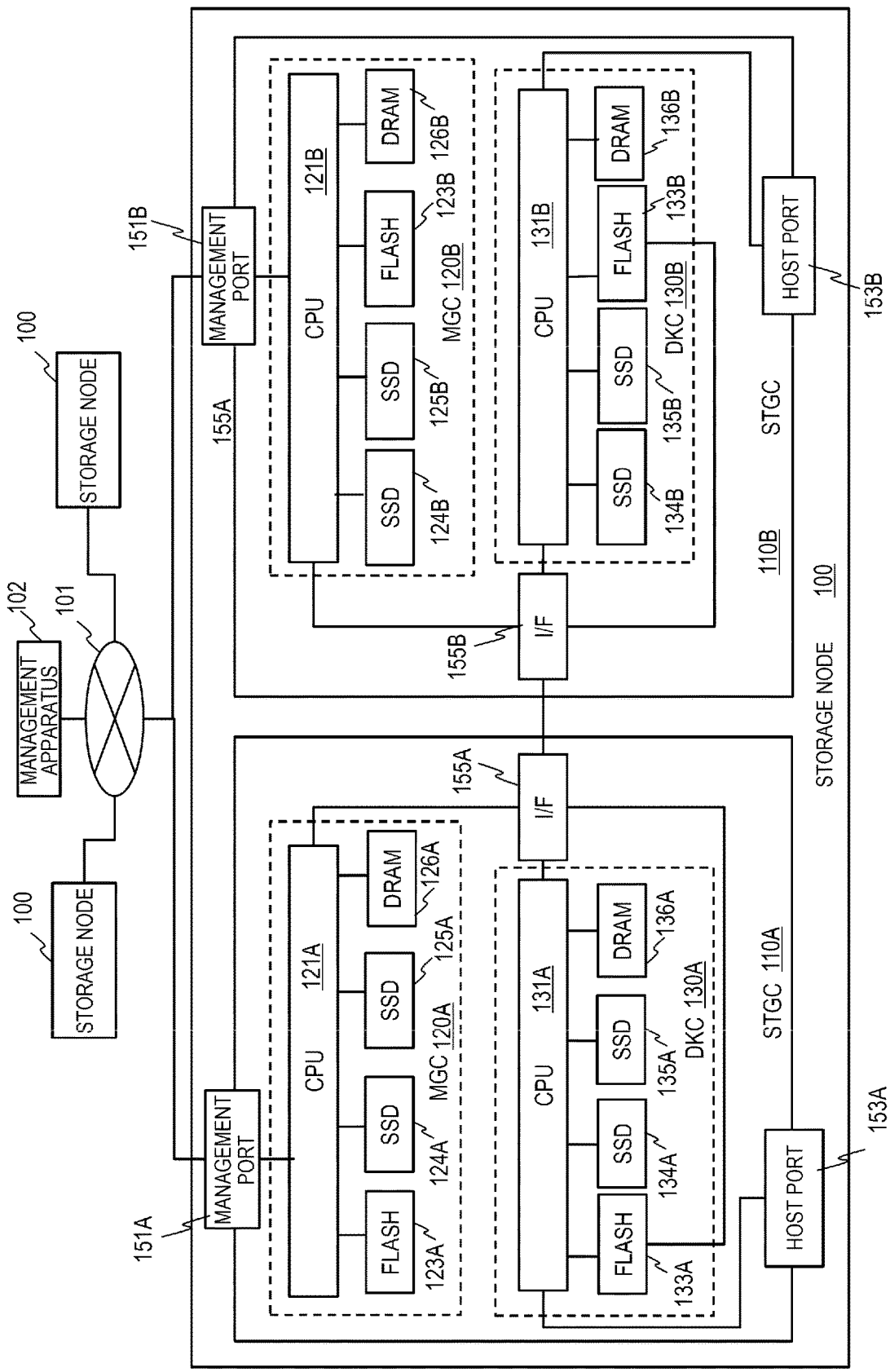
FIG. 1 illustrates a configuration example of a storage system and related apparatus thereof according to an embodiment of the present description.

Hereinafter, an embodiment of the present invention will be described in detail with reference to the drawings. In the following description, the same components are denoted by the same reference numerals in principle, and repetitive description thereof is omitted. It should be noted that the embodiment described below is merely an example for implementing the present invention and does not limit the technical scope of the present invention.

System Configuration

Referring to FIG. 1, a configuration example of a storage system and related apparatus thereof according to an embodiment of the present description will be described. The storage system includes one or more storage nodes 100. FIG. 1 illustrates three storage nodes 100 as an example. One or more hosts (not illustrated) are connected to the storage nodes 100 via a network (not illustrated).

In order to manage host data, each of the hosts issues various requests such as a read request or a write request (I/O request) to the storage nodes 100 via the network. The network can use a protocol such as Fibre Channel (FC) or Ethernet, for example.

A management apparatus 102 is connected to each of the storage nodes 100 via a network 101. In addition, the storage nodes 100 can communicate with each other via the network 101.

An administrator of the system manages the storage nodes 100 by operating the management apparatus 102. The network 101 can use, for example, a local area network (LAN). As described later, when tampering of software is detected in the storage node 100, information thereof is transmitted to the management apparatus 102. The management apparatus 102 presents the information to the administrator in a display apparatus (not illustrated) in FIG. 1.

The management apparatus 102 may have, for example, a computer configuration. Specifically, the management apparatus 102 can include an arithmetic device, a main storage device, an auxiliary storage device, an input device, an output device, and a communication interface. The arithmetic device implements a predetermined function by executing a program stored in the main storage device. The program is, for example, loaded from the auxiliary storage device to the main storage device.

In general, the main storage device includes a volatile storage medium, and the auxiliary storage device includes a non-volatile storage medium. The configuration of the management apparatus 102 is not particularly limited. The input device is, for example, a mouse, a keyboard, or a combination thereof, and the output device is, for example, a display device or a printing device.

Each storage node 100 is equipped with two storage controllers (STGC) 110A and 110B having the same function for high system reliability. The storage node 100 may be equipped with one or more storage drives (not illustrated) as storage media for holding data from the hosts (referred to as host data). The storage drives are, for example, a hard disk drive (HDD) and a solid state drive (SSD).

Hereinafter, an example of the two storage controllers 110A and 110B in the storage node 100 will be described. The number of storage controllers in each storage node 100 is not particularly limited. The storage node can include three or more storage controllers, and the number of equipped storage controllers may differ between the storage nodes.

The storage controller 110A includes a management controller (MGC) 120A and a disk controller (DKC) 130A. The above are different hardware devices. The disk controller is also referred to as an input and output controller. The storage controller 110A further includes a management port 151A, a host port 153A, and an internal communication interface 155A.

The management port 151A is an interface for the storage controller 110A to communicate with the management apparatus 102 and a storage controller of another storage node, and the host port 153A is an interface for the storage controller 110A to transmit and receive the host data to and from the host.

The internal communication interface 155A is an interface for the storage controller 110A to communicate with the other storage controller 110B in the same storage node. The internal communication interface 155A stores environment information, environment setting, and the like in the system, and enables communication between the devices.

The management controller 120A manages the storage nodes 100 according to an instruction from the administrator. For example, the management controller 120A executes setting of the storage nodes 100, including creation and setting of a volume.

The management controller 120A includes a central processing unit (CPU) 121A, which is an arithmetic device that executes management, a flash memory 123A, and a plurality of SSDs 124A and 125A. The above are different hardware devices, and the number of each is not limited. The management controller 120A further includes a DRAM 126A used as a main storage device. The DRAM is a memory including a volatile storage medium.

The CPU 121A implements a predetermined management function by executing a program stored in the DRAM 126A. The processing executed by the CPU 121A is the processing executed by the management controller 120A. The CPU 121A communicates with the management apparatus 102 and other storage nodes via the management port 151A.

In an embodiment of the present description, the CPU 121A inspects and activates software stored in and executed by itself, and inspects and activates a part of software stored in the disk controller 130A. Inspect means to determine presence or absence of tampering of the software. For example, a known technique using an electronic signature can be used in the determination of the presence or absence of tampering of the software. Accordingly, reliability of the storage system can be improved. A subject of the inspection can be changed from the configuration in the embodiment of the present description.

The flash memory 123A and the SSDs 124A and 125A are storage devices with different interface protocols. For example, the flash memory 123A can use Serial Peripheral Interface (SPI), and the SSDs 124A and 125A can use Non-Volatile Memory Express (NVMe). In this way, the software can be efficiently held by using different types of storage devices. In an embodiment of the present description, a capacity of each of the SSDs 124A and 125A is larger than a capacity of the flash memory 123A. One type of storage device may be implemented alone.

In activation of the management controller 120A, the CPU 121A first accesses the flash memory 123A and activates the stored software (program). Thereafter, the CPU 121A accesses the SSD 125A to activate software of the SSD 125A.

The CPU 121A inspects the software of the SSD 125A to determine presence or absence of tampering. In addition, the CPU 121A inspects the software of the disk controller 130A. When tampering of the software is detected, the CPU 121A stores the tampered software in the SSD 124A.

In this way, by storing the tampered software, detailed analysis can be performed later. In addition, as described later, the tampered software of the SSD 125A is rolled back using a backup. Security can be improved by storing the tampered software in the SSD 124A different from the SSD 125A. The CPU 121A does not need to inspect the software of the disk controller 130A.

The disk controller 130A processes input and output of the host data. The disk controller 130A stores the host data received from the host in the storage drive in response to the write request from the host, reads data specified from the storage drive in response to the read request from the host, and transfers the data to the host. The host data is logically stored in the volume. The volume is associated with a storage area of the storage drive.

The disk controller 130A includes a CPU 131A, which is an arithmetic device that inputs and outputs the host data, a flash memory 133A, and SSDs 134A and 135A. The above are different hardware devices. The disk controller 130A further includes a DRAM 136A used as a main storage device.

The CPU 131A implements a predetermined management function by executing a program stored in the main storage device. The processing executed by the CPU 131A is the processing executed by the disk controller 130A. The CPU 131A communicates with the host via the host port 153A.

The CPU 131A inspects and activates software stored in and executed by itself. The inspection determines presence or absence of tampering of the software. Accordingly, reliability of the storage system can be improved.

The flash memory 133A and the SSDs 134A and 135A are storage devices with different interface protocols. For example, the flash memory 133A can use SPI, and the SSDs 134A and 135A can use NVMe. In this way, the software can be efficiently held by using different types of storage devices. In one embodiment of the present description, a capacity of each of the SSDs 134A and 135A is larger than a capacity of the flash memory 133A. One type of storage device may be used alone.

The disk controller 130A is activated in response to a notification from the management controller 120A. In the embodiment of the present description, a part of the software of the disk controller 130A is inspected by the management controller 120A before the activation of the disk controller 130A. When tampering is not detected, the activation of the disk controller 130A is started.

In the embodiment of the present description, the management controller 120A inspects software stored in the flash memory 133A. The management controller 120A can access the flash memory 123A not via the CPU 131A but via the internal communication interface 155A.

After the inspection by the management controller 120A, the disk controller 130A accesses the flash memory 133A to activate the inspected software, and further inspects a remaining part of the software to determine presence or absence of tampering. In the embodiment of the present description, the remaining part is software stored in the SSD 135A. Accordingly, security reliability of the storage system can be improved.

The disk controller 130A detects tampering of the software stored in the SSD 135A and stores the tampered software in the SSD 134A. In this way, by storing the tampered software, detailed analysis can be performed later. The SSD 134A stores only the tampered software without storing software for operating the storage nodes 100. Accordingly, the security can be improved.

In the embodiment of the present description, the storage controller 110B has the same configuration as that of the storage controller 110A, and includes components of the same type. Specifically, the storage controller 110B includes a management controller 120B and a disk controller 130B. The storage controller 110B further includes a management port 151B, a host port 153B, and an internal communication interface 155B. Communication between the storage controllers 110A and 110B is executed via the internal communication interfaces 155A and 155B.

Similarly to the management controller 120A, the management controller 120B includes a CPU 121B, a flash memory 123B, and SSDs 124B and 125B. The management controller 120A further includes a DRAM 126B used as a main storage device. Similarly to the disk controller 130A, the disk controller 130B includes a CPU 131B, a flash memory 133B, and SSDs 134B and 135B. The disk controller 130B further includes a DRAM 136B used as a main storage device.

The CPU 121B of the management controller 120B can access the flash memory 133B of the disk controller 130B via the internal communication interface 155B.

The management controller 120B and the disk controller 130B respectively execute operation of the management controller 120A and the disk controller 130A. The management controllers 120A and 120B may have different configurations, and the disk controllers 130A and 130B may have different configurations.

The storage controllers 110A and 110B have a redundant configuration, and when one fails, the other takes over processing to be executed by the failed one. When one of the two management controllers 120A and 120B fails, the other takes over the processing.

As described above, the management controllers 120A and 120B inspect the software executed by themselves and the software of the disk controller in the same storage controller. Therefore, when one management controller, for example, the management controller 120B fails, the management controller 120A of the redundant configuration executes the inspection of the software of the disk controller 130B instead of the management controller 120B.

In the embodiment of the present description, when tampering of the software is detected in one management controller and the activation of the management controller is interrupted, normal software is transferred from the other management controller, and recovery is executed. The transfer of the normal software may be executed by the other management controller in the same node as the management controller in which tampering is detected or by another management controller in another node. Accordingly, a management controller that cannot be activated due to tampering of the software can be activated and operated.

Figure 2:
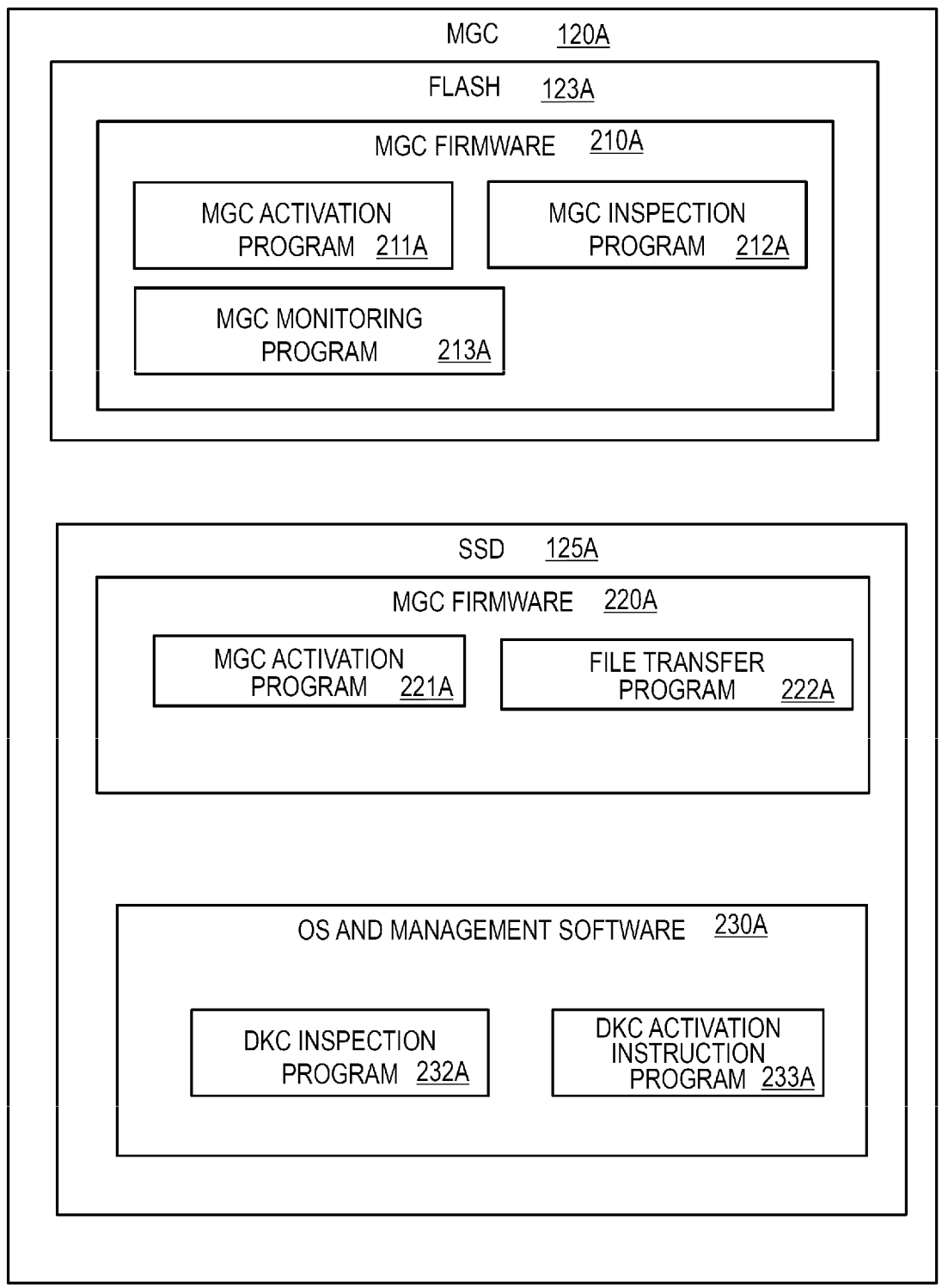
FIG. 2 illustrates a configuration example of software stored by a management controller.

FIG. 2 illustrates a configuration example of the software (program) stored in the management controller 120A. The management controller 120B of the storage controller 110B stores software similar to that of the management controller 120A. The flash memory 123A of the management controller 120A stores MGC firmware 210A. The MGC firmware 210A includes an MGC activation program 211A, an MGC inspection program 212A, and an MGC monitoring program 213A.

The SSD 125A of the management controller 120A stores MGC firmware 220A, an operating system (OS), and management software 230A. The management software operates on the OS. The MGC firmware 220A includes an MGC activation program 221A and a file transfer program 222A. The OS and the management software 230A include a DKC inspection program 232A and a DKC activation instruction program 233A.

Figures 3, 4:
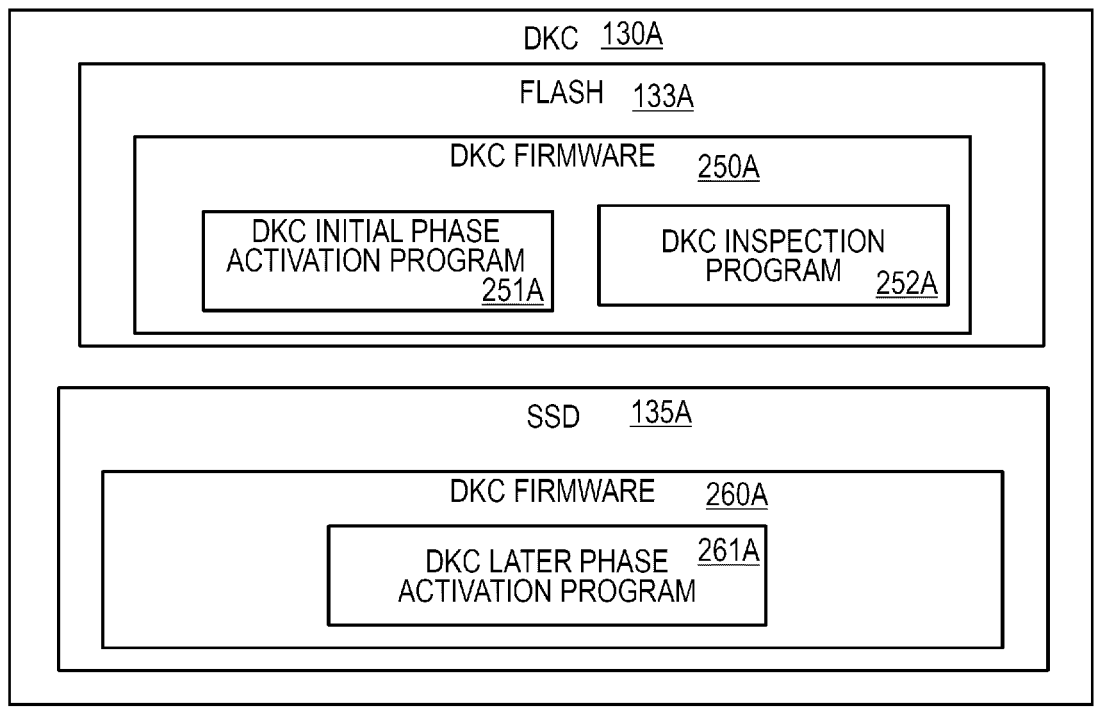
FIG. 3 illustrates a configuration example of software stored by a disk controller.
FIG. 4 illustrates a configuration example of a software information table.

FIG. 3 illustrates a configuration example of the software (program) stored in the disk controller 130A. The disk controller 130B of the storage controller 110B stores software similar to that of the disk controller 130A.

The flash memory 133A of the disk controller 130A stores DKC firmware 250A. The DKC firmware 250A includes a DKC initial phase activation program 251A and a DKC inspection program 252A. The SSD 135A of the disk controller 130A stores the DKC firmware 250A. DKC firmware 260A includes a DKC later phase activation program 261A. The DKC firmware 260A includes, for example, software that inputs and outputs the host data.

Management Information

FIGS. 4 to 10 illustrate tables included in management information held by the management controllers 120A and 120B. In these tables, management controllers and disk controllers having a redundant configuration are held in the system as common information. The management information is stored in, for example, SSDs of the management controllers and the disk controllers.

FIG. 4 illustrates a configuration example of a software information table 310. The software information table 310 indicates version information of software to be executed by the management controllers and the disk controllers in the system. Device column 311 indicates a type of the controller, that is, the management controller or the disk controller. Location ID column 312 identifies a storage controller in which the management controller or the disk controller is present. SW ver. column 313 indicates a version of the software executed by the management controller or the disk controller.

FIG. 5 illustrates a configuration example of a check result management table 320. The check result management table 320 stores an inspection result of the software of the storage controller. Date column 321 indicates a date and time of the inspection, and Device column 322 indicates a type of the controller that is an inspection target, that is, the management controller or the disk controller. Location ID column 323 identifies a storage controller in which the management controller or the disk controller is present. Result column 324 indicates the inspection result.

FIG. 6 illustrates a configuration example of a heartbeat information table 330. A monitoring result between the management controllers is stored. Date column 331 indicates a date and time at which a heartbeat signal is received, and MGC Location ID column 332 indicates a transmission source of the heartbeat signal.

FIG. 7 illustrates a configuration example of a monitoring target management table 340. The monitoring target management table 340 indicates a disk controller that is a management target and the other management controller in cooperation. MGC ID column 341 indicates an ID of the management controller. DKC ID column 342 indicates a disk controller managed by the management controller indicated by MGC ID column 341. MGC ID column 343 indicates an ID of a management controller that is a monitoring target, which cooperates with the management controller indicated by MGC ID column 341. In the example, the IDs of the disk controller and the management controller coincide with their Location IDs.

FIG. 8 illustrates a configuration example of a log management table 350. The log management table 350 manages event logs generated in the system. The log management table 350 includes log information when tampering occurred. Date column 351 indicates an event occurrence date and time. Event ID column 352 indicates an ID of an occurred event. Event Name column 353 indicates a name of the occurred event. Severity column 354 indicates importance of the event. Device column 355 indicates a device in which the event occurred. Location ID column 356 indicates an ID of a storage controller in which the event occurred.

FIG. 9 illustrates a configuration example of a report record management table 360. The report record management table 360 stores a report record when tampering occurred. A report is transmitted to, for example, the management apparatus 102.

Date column 361 indicates an occurrence date and time of an event that is a reporting target. Event ID column 362 indicates an ID of the target event. Event Name column 363 indicates a name of the target event. Severity column 364 indicates importance of the target event. Device column 365 indicates a device in which tampering is detected. Location ID column 366 indicates an ID of a storage controller in which tampering is detected.

FIG. 10 illustrates a configuration example of a tampered firmware storage management table 370. The tampered firmware storage management table 370 manages tampered firmware stored in a dedicated SSD.

Date column 371 indicates a date and time when the tampered firmware is stored. Device column 372 indicates a device in which tampering is detected. Location ID column 373 indicates an ID of a storage controller in which tampering is detected. Backup Device column 374 indicates a device in which the tampered firmware is stored. Here, a controller storage that are stored are illustrated. Backup Location ID column 375 indicates an ID of a storage controller in which the tampered firmware is stored. In the example, each management controller and each disk controller include a storage device that stores only one tampered firmware.

Tampering Detection of Software of Management Controller

Figure 11:
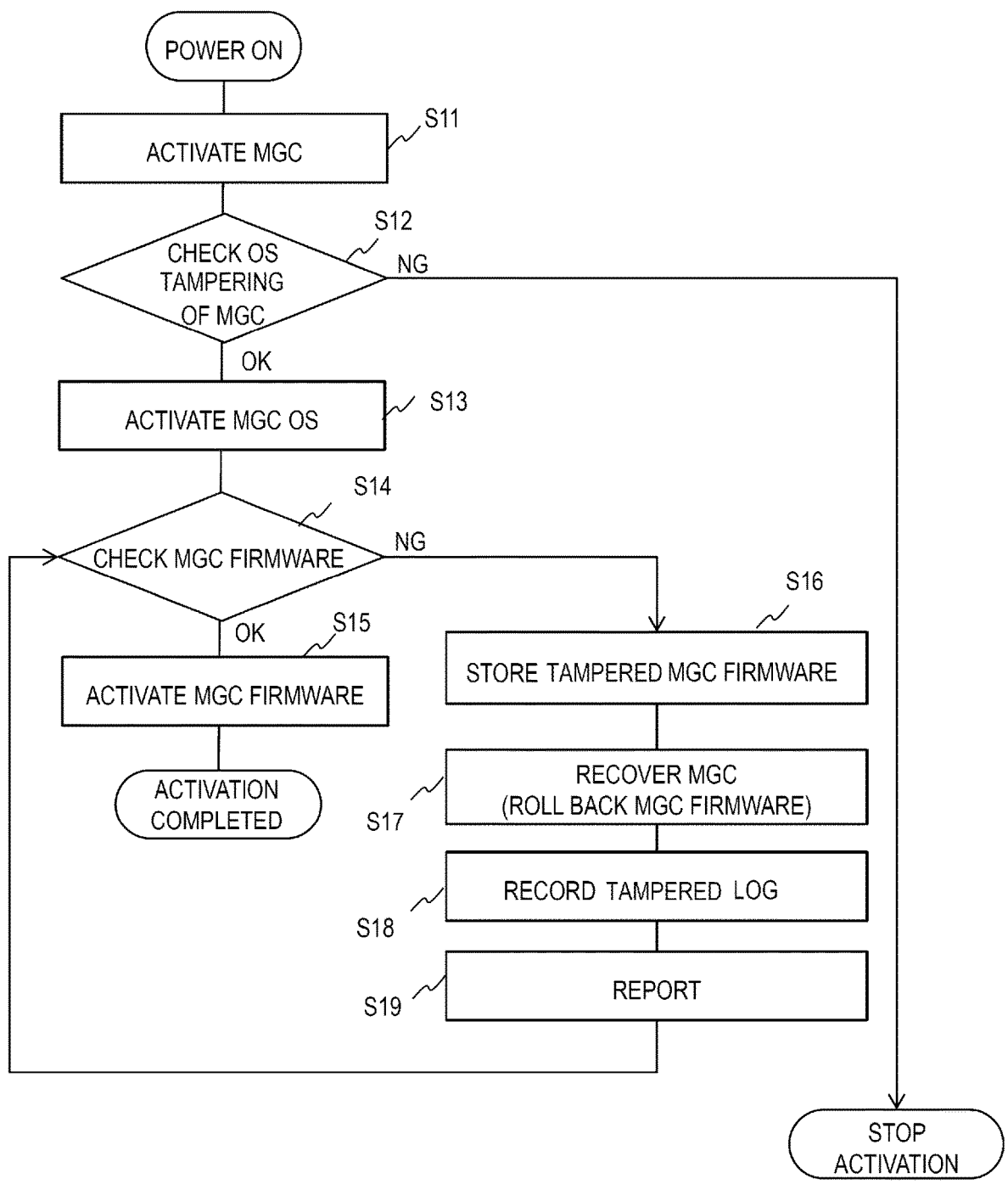
FIG. 11 illustrates a flowchart of an example of a tampering inspection method in activation of a storage controller.

FIG. 11 illustrates a flowchart of an example of a tampering inspection method in the activation of the storage controller 110A. The storage controller 110B also executes the same processing. In the processing example described with reference to FIG. 11, when tampering is detected in firmware of a management controller, recovery thereof is executed. In addition, the tampered firmware is stored in a dedicated SSD of the management controller.

First, the activation of the management controller 120A is started (S11). The CPU 121A of the management controller 120A checks tampering of the software stored in the management controller 120A (S12). Specifically, the CPU 121A activates the MGC activation program 221A of the MGC firmware 220A stored in the SSD 125A starting from execution of the MGC activation program 211A stored in the flash memory 123A.

Further, the CPU 121A executes the MGC inspection program 212A in the MGC firmware 210A stored in the flash memory 123A. The CPU 121A executes inspection of the OS and the management software 230A stored in the SSD 125A according to the MGC inspection program 212A. An inspection result is recorded in the check result management table 320.

When tampering is detected in the OS and the management software 230A stored in the management controller 120A (S12: NG), since reliability of the management controller 120A is reduced, the activation of the storage controller 110A is stopped. Accordingly, higher reliability can be obtained.

When tampering is not detected (S12: OK), the CPU 121A activates the OS and the management software 230A according to the MGC activation program 221A (S13). The management software is activated after the OS.

Next, the CPU 121A inspects an unexecuted program of the MGC firmware 220A according to the MGC inspection program 212A. An inspection result is recorded in the check result management table 320. When tampering is not detected (S14: OK), the CPU 121A executes the inspected program of the MGC firmware 220A (S15).

When tampering is detected in the MGC firmware 220A (S14: NG), the CPU 121A stores the tampered firmware in the SSD 124A of the management controller 120A according to the MGC inspection program 212A, and registers information thereof in the tampered firmware storage management table 370 (S16).

Next, the CPU 121A executes recovery of the tampered firmware according to the MGC inspection program 212A (S17). Specifically, the CPU 121A refers to the software information table 310 to identify a software version of the management controller 120A, and updates the MGC firmware 220A in which tampering is detected by a backup of MGC firmware having the version. The backup is stored in, for example, the SSD 125A or the flash memory 123A of the management controller 120A.

The CPU 121A further records a tampering log indicating the execution of the recovery in the log management table 350 according to the MGC inspection program 212A (S18). Subsequently, the CPU 121A reports the management apparatus 102 in which tampering is detected and the recovery is executed according to the MGC inspection program 212A (S19). Report information is recorded in the report record management table 360. Thereafter, the flow returns to step S14.

Figure 12:
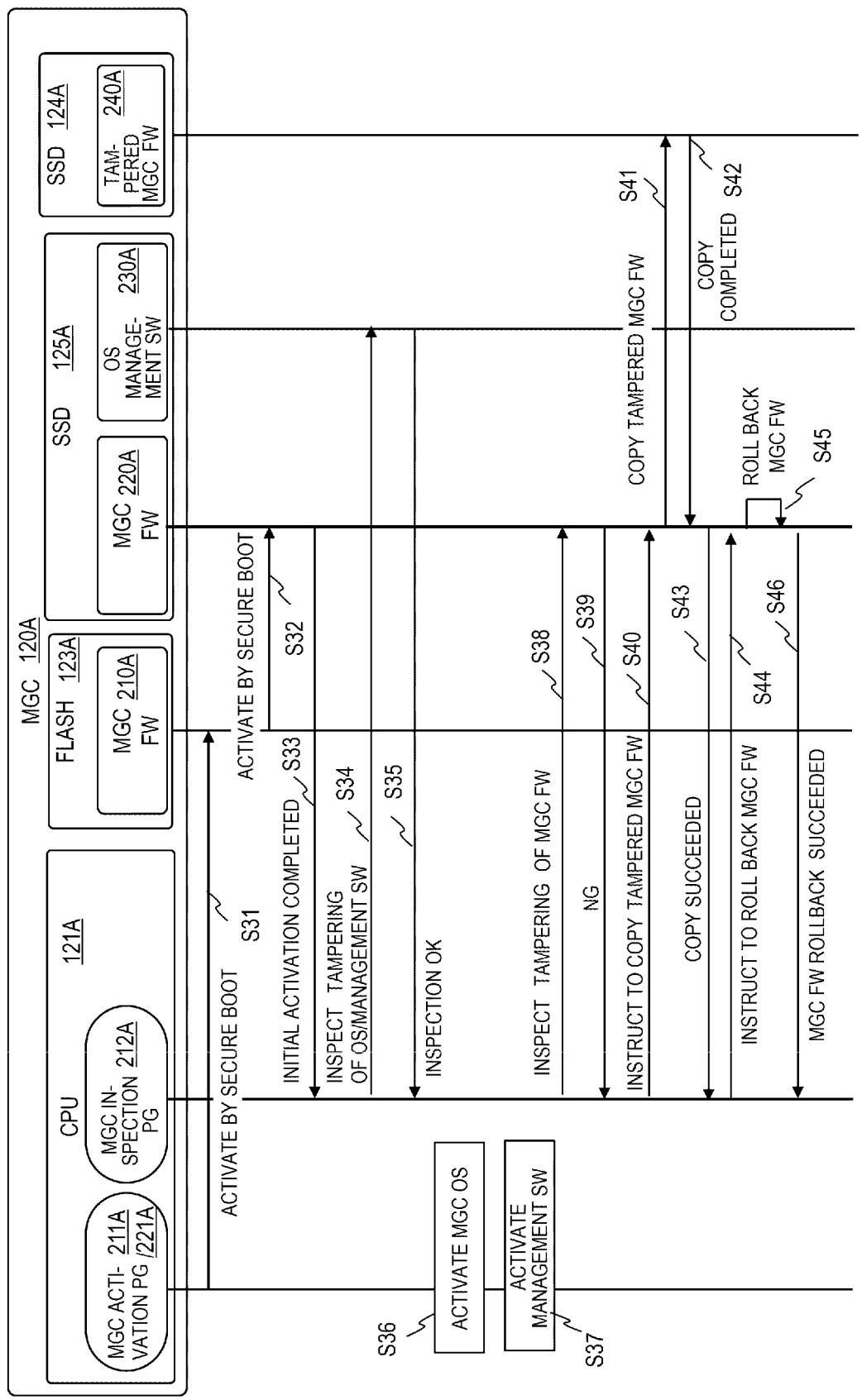
FIG. 12 illustrates a sequence diagram of a processing example when tampering is detected in firmware of management controller.

FIG. 12 illustrates a sequence diagram of a processing example when tampering is detected in the MGC firmware (FW) 220A. In the following description of each sequence diagram, reception and execution of a data access instruction to the flash memory or the SSD and response of an execution result are actually processed by the firmware or the software stored in the flash memory or the SSD, but the description thereof is omitted as processing by the flash memory or the SSD.

The MGC activation program (PG) 211A of the management controller 120A activates another program of the MGC firmware 210A in the flash memory 123A by secure boot (S31). The MGC activation program 211A further activates the MGC activation program 221A of the MGC firmware 220A in the SSD 125A by the secure boot (S32).

When initial activation of the firmware 210A and 220A of the management controller 120A is completed (S33), the MGC inspection program 212A inspects the OS and the management software 230A in the SSD 125A (S34). When an inspection result indicates that there is no tampering (S35), the MGC activation program 221A activates the OS in the OS and the management software 230A (S36), and then activates the management software (S37).

Next, the MGC inspection program 212 inspects the unexecuted software in the MGC firmware 220A in the SSD 125A (S38). When tampering is detected (S39), the MGC inspection program 212A copies tampered firmware 240 in the SSD 125A from the SSD 125A to the SSD 124A (S41, S42, and S43). The MGC inspection program 212A instructs the SSD 125A to copy tampered firmware 240A to the SSD 124A. The SSD 125A receives a completion response from the SSD 124A, and returns a copy success response to the MGC inspection program 212A.

Next, the MGC inspection program 212A recovers the tampered firmware (S44, S45, and S46). For example, the MGC inspection program 212 instructs the SSD 125A to update the tampered firmware by a backup stored in the SSD 125A. The MGC inspection program 212A instructs the SSD 125 to update, and the SSD 125 returns a success response after the update.

Next, an example of cooperation of two management controllers will be described. When one management controller is normally activated and then the other management controller cannot be normally activated, in the embodiment of the present description, normal firmware is copied from the normally activated management controller, and firmware of the management controller where the activation is failed is rolled back. Safety can be improved by recovery by a backup from the other management controller.

Management controllers monitored by each management controller are registered in the monitoring target management table 340. In addition, each controller can monitor the other management controller by using the heartbeat signal. A monitoring result obtained by the heartbeat signal is registered in the heartbeat information table 330 as described above.

Figure 13:
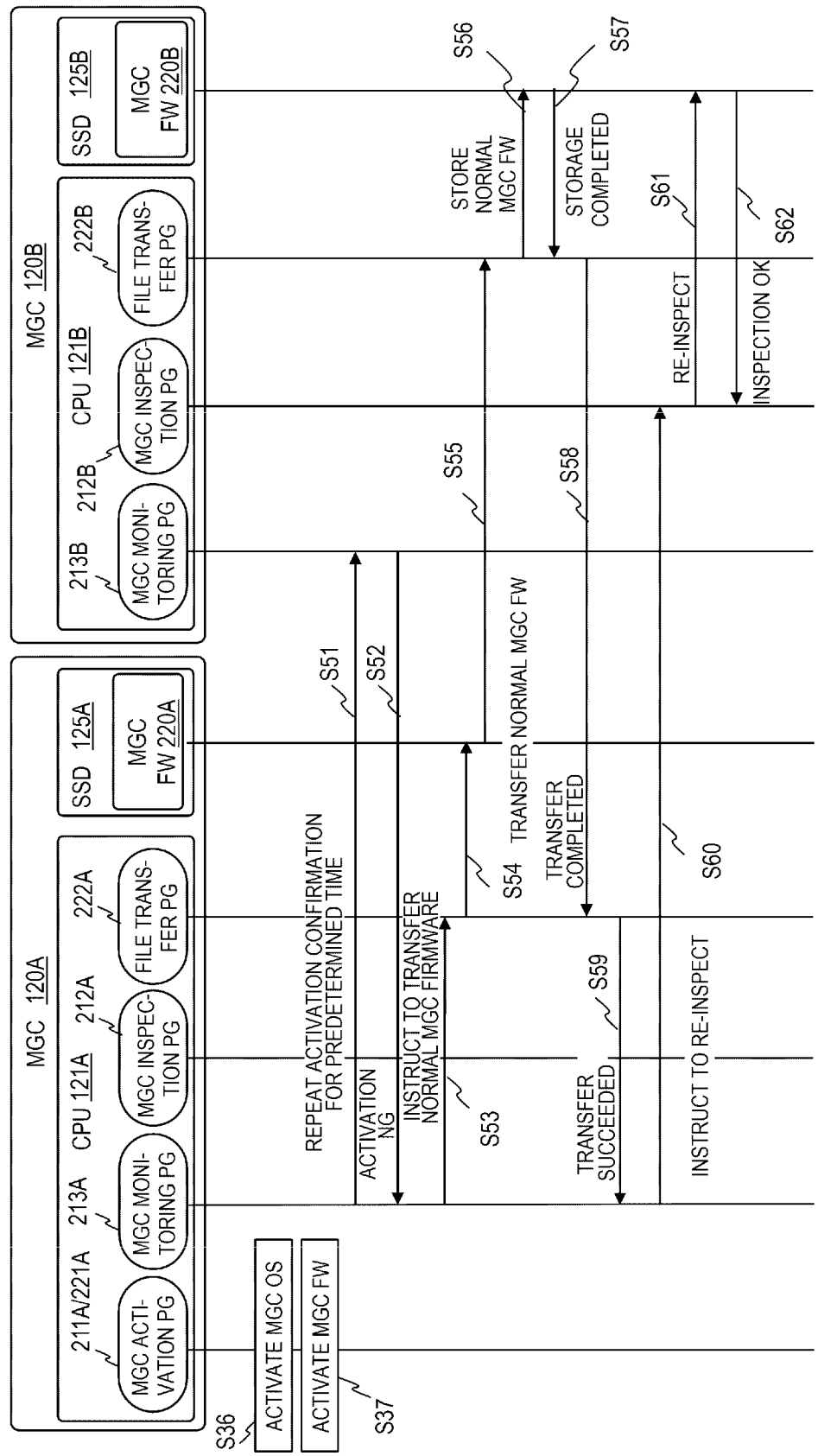
FIG. 13 illustrates an example of cooperation of two management controllers of the same storage node.

FIG. 13 illustrates an example of cooperation of two management controllers storage node. A management controller activated first confirms activation of the other management controller. When the activation of the firmware of the other management controller cannot be detected for a predetermined time, the normally activated management controller copies normal firmware to the other management controller, and rolls back the firmware of the management controller where the activation is failed. The management controller can execute processing described below in addition to or instead of the processing described with reference to FIG. 12.

In an example described below, the management controller 120B fails to activate, and the normal MGC firmware is copied from the normally activated management controller 120A to the management controller 120B. As described with reference to FIG. 12, it is assumed that the management controller 120B checks tampering of the OS and the management software and then detects tampering in the inspection of the MGC firmware 220. The management controller 120B stores the tampered firmware in the SSD 124B. The backup is not stored in the management controller 120B, or the rollback cannot be performed by the backup and the activation is interrupted.

After the management controller 120 is normally activated (S36, S37), the MGC monitoring program 213A of the management controller 120A repeats activation confirmation of the management controller 120B for a predetermined period of time (S51). When there is no normal activation response from an MGC monitoring program 213B of the management controller 120B (S52), the MGC monitoring program 213A instructs the file transfer program 222A of the management controller 120A to transfer the normal MGC firmware (S53).

The file transfer program 222A reads the normal MGC firmware stored in the SSD 125A of the management controller 120A (S54), and transfers the normal MGC firmware to the management controller 120B (S55).

A file transfer program 222B of the management controller 120B receives the normal MGC firmware from the management controller 120A and stores the normal MGC firmware in the SSD 125B of the management controller 120B (S56). MGC firmware 220B in the SSD 125B may be rewritten with the transferred MGC firmware.

Upon receiving a completion response from the SSD 125B (S57), the file transfer program 222B returns a transfer completion notification to the file transfer program 222A (S58). The file transfer program 222A notifies the MGC monitoring program 213A of success of the normal MGC firmware (S59).

The MGC monitoring program 213A instructs an MGC inspection program 212B of the management controller 120B to re-inspect the MGC firmware 220B (S60). The MGC inspection program 212B re-inspects the MGC firmware 220B (S61), and obtains a normal inspection result (S62). After the reinspection, the management controller 120B executes subsequent activation. The security is improved by the reinspection.

Figure 14:
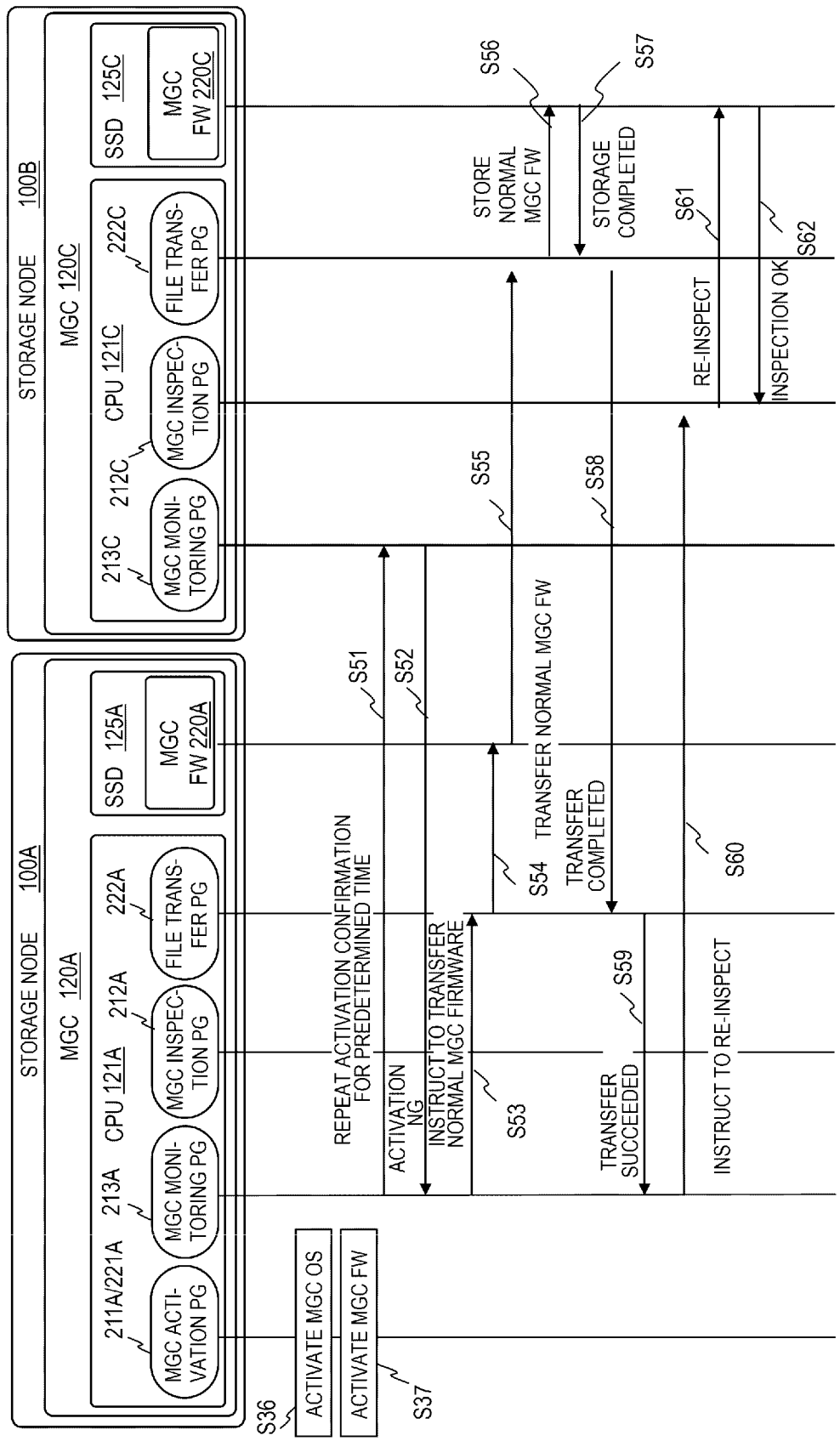
FIG. 14 illustrates an example of cooperation of two management controllers of different storage nodes.

The cooperation described with reference to FIG. 13 is executed between the management controllers of the same storage node. The same processing can be executed between management controllers of different storage nodes as illustrated in FIG. 14. After activation of one storage node is completed, a management controller of the storage node whose activation is completed confirms activation of a management controller of another storage node.

In a configuration example in FIG. 14, the management controller 120A of a storage node 100A confirms activation of a management controller 120C of the other storage node 100B. The management controller 120C includes a CPU 121C and an SSD 125C, which correspond to the CPU 121B and the SSD 125B of the management controller 120B in FIG. 13. In addition, the CPU 121C executes an MGC management program 213C, an MGC inspection program 212C, and a file transfer program 222C. The above correspond to the MGC monitoring program 213B, the MGC inspection program 212B, and the file transfer program 222B of the management controller 120B in FIG. 13. MGC firmware 220C stored in the SSD 125C corresponds to the MGC firmware 220B stored in the SSD 125B. When the activation of the MGC firmware by the management controller 120C of the storage node 100B cannot be detected for a predetermined time, the normally activated management controller 120A copies the normal MGC firmware to the management controller 120C where the activation is failed. Therefore, the management controller 120C that received the normal MGC firmware rolls back the MGC firmware.

After completion of the rollback of the MGC firmware, the management controller 120C re-inspects the MGC firmware. The storage node 100B that copied and recovered the MGC firmware from the other storage node 100A executes cooperation between management controllers in the same storage node 100B as described with reference to FIG. 13.

Tampering Detection of Software of Disk Controller

Figure 15:
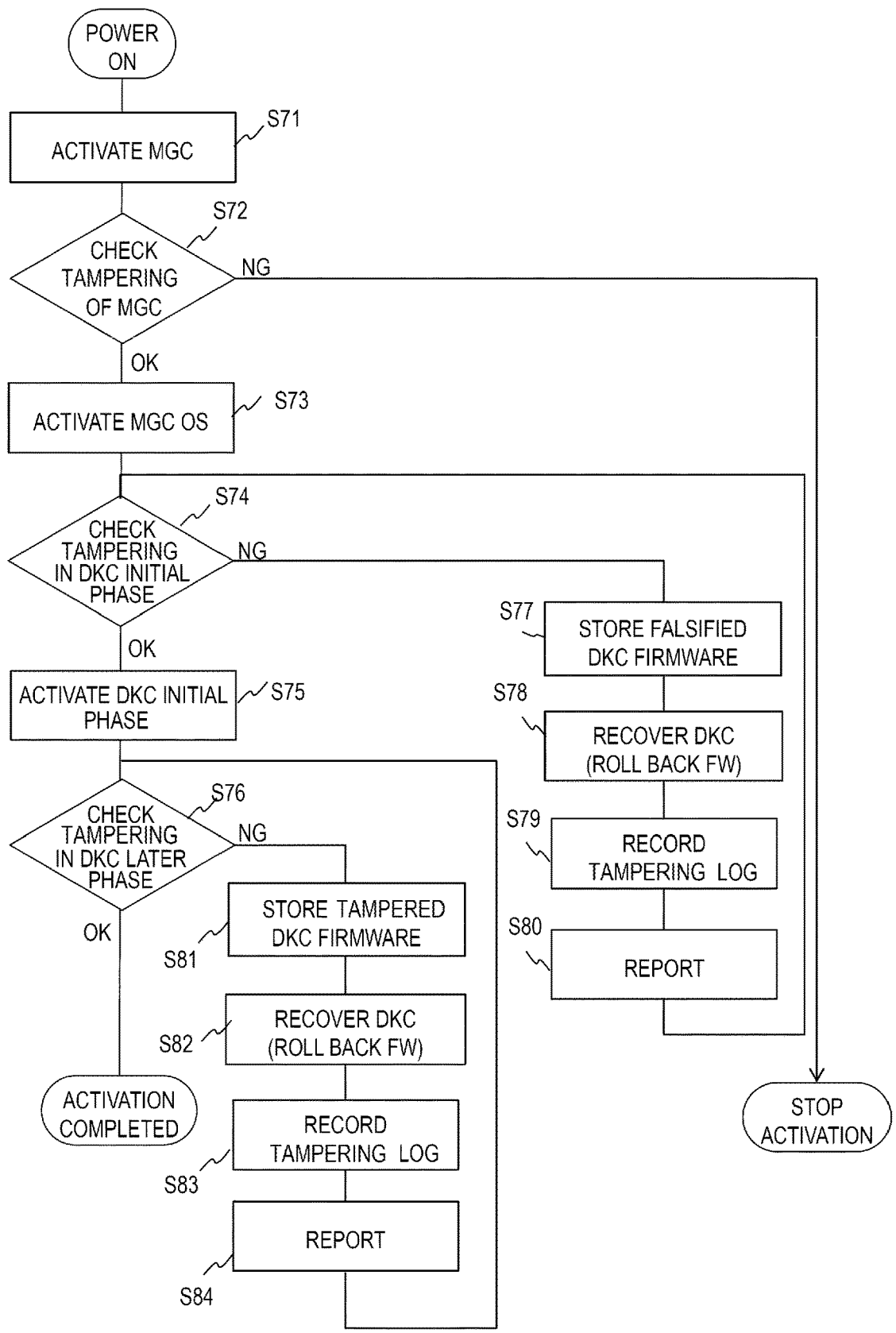
FIG. 15 illustrates a flowchart of an example of the tampering inspection method in the activation of the storage controller.

Next, tampering detection of software of a disk controller will be described. FIG. 15 illustrates a flowchart of an example of a tampering inspection method in the activation of the storage controller 110A. In FIG. 15, steps S71, S72, and S73 are the same as S11, S12, and S13 of the flowchart illustrated in FIG. 11. In addition, in FIG. 15, steps S14 to S19 illustrated in FIG. 11 are omitted, and the management controller 120A may execute steps S14 to S19 illustrated in FIG. 11 also in the present processing.

In step S74, the CPU 121A of the management controller 120A executes DKC initial phase tampering check according to the DKC inspection program 232A. Specifically, the CPU 121A executes the DKC inspection program 232A, accesses the flash memory 133A of the disk controller 130A via the internal communication interfaces 155A and 155B, and inspects the DKC firmware 250A. An inspection result is recorded in the check result management table 320.

When tampering of the DKC firmware 250A is not detected (S74: OK), DKC initial phase activation is started (S75). Specifically, the CPU 121A instructs the CPU 131A of the disk controller 130A to activate according to the DKC activation instruction program 233A. The CPU 131A activates the DKC initial phase activation program 251A of the inspected DKC firmware 250A. The CPU 131A activates a program including the DKC inspection program 252A according to the DKC initial phase activation program 251A.

The CPU 131A executes DKC later phase tampering check (S76). Specifically, the CPU 131A inspects tampering of the DKC firmware 260A stored in the SSD 135A according to the DKC inspection program 252A. An inspection result is recorded in the check result management table 320.

When tampering of DKC firmware 260A is not detected (S76: OK), the CPU 131A sequentially activates the programs of the DKC firmware 260A according to the DKC later phase activation program 261A (DKC later phase activation). Accordingly, the activation of the storage controller 110A is completed.

Referring to step S74, when tampering is detected in the DKC initial phase tampering check (S74: NG), the CPU 121A of the management controller 120A stores the tampered DKC firmware (S77). Specifically, the CPU 121A stores the tampered DKC firmware 250A in the SSD 124A of the management controller 120A according to the DKC inspection program 232A. Accordingly, detailed analysis of the tampered firmware can be performed later.

Further, the CPU 121A executes recovery of the disk controller 130A according to the DKC inspection program 232A (S78). Specifically, the CPU 121A refers to the software information table 310 to identify a software version of the disk controller 130A, and updates the DKC firmware 250A in which tampering is detected by a backup of DKC firmware having the version. The backup is stored, for example, in the SSD 135A or the flash memory 133A of the disk controller 130A.

The CPU 121A further records a tampering log indicating the execution of the recovery in the log management table 350 according to the DKC inspection program 232A (S79). Subsequently, the CPU 121A reports the management apparatus 102 in which tampering is detected and the recovery is executed according to the DKC inspection program 232A (S80). Report information is recorded in the report record management table 360. Thereafter, the flow returns to step S74. When tampering is detected by the recovered software, the recovery is executed by another backup software or the activation is stopped.

Referring to step S76, when tampering is detected in the DKC later phase tampering check (S76: NG), the CPU 131A of the disk controller 130A stores the tampered DKC firmware (S77). Specifically, the CPU 121A stores the tampered DKC firmware 260A in the SSD 124A of the management controller 120A according to the DKC inspection program 232A. Accordingly, detailed analysis of the tampered firmware can be performed later.

Further, the CPU 131A executes the recovery of the disk controller 130A according to the DKC inspection program 252A (S82). The CPU 131A refers to the software information table 310 to identify the software version of the disk controller 130A, and updates the tampered DKC firmware 260A by the backup of the DKC firmware having the version. The backup is stored, for example, in the SSD 125A of the management controller 120A or the SSD 135A of the disk controller 130A.

The CPU 131A further records a tampering log indicating the execution of the recovery in the log management table 350 according to the DKC inspection program 252A (S83). Subsequently, the CPU 131A reports the management apparatus 102 in which tampering is detected and the recovery is executed according to the DKC inspection program 252A (S84). Report information is recorded in the report record management table 360. Thereafter, the flow returns to step S76.

Figure 16:
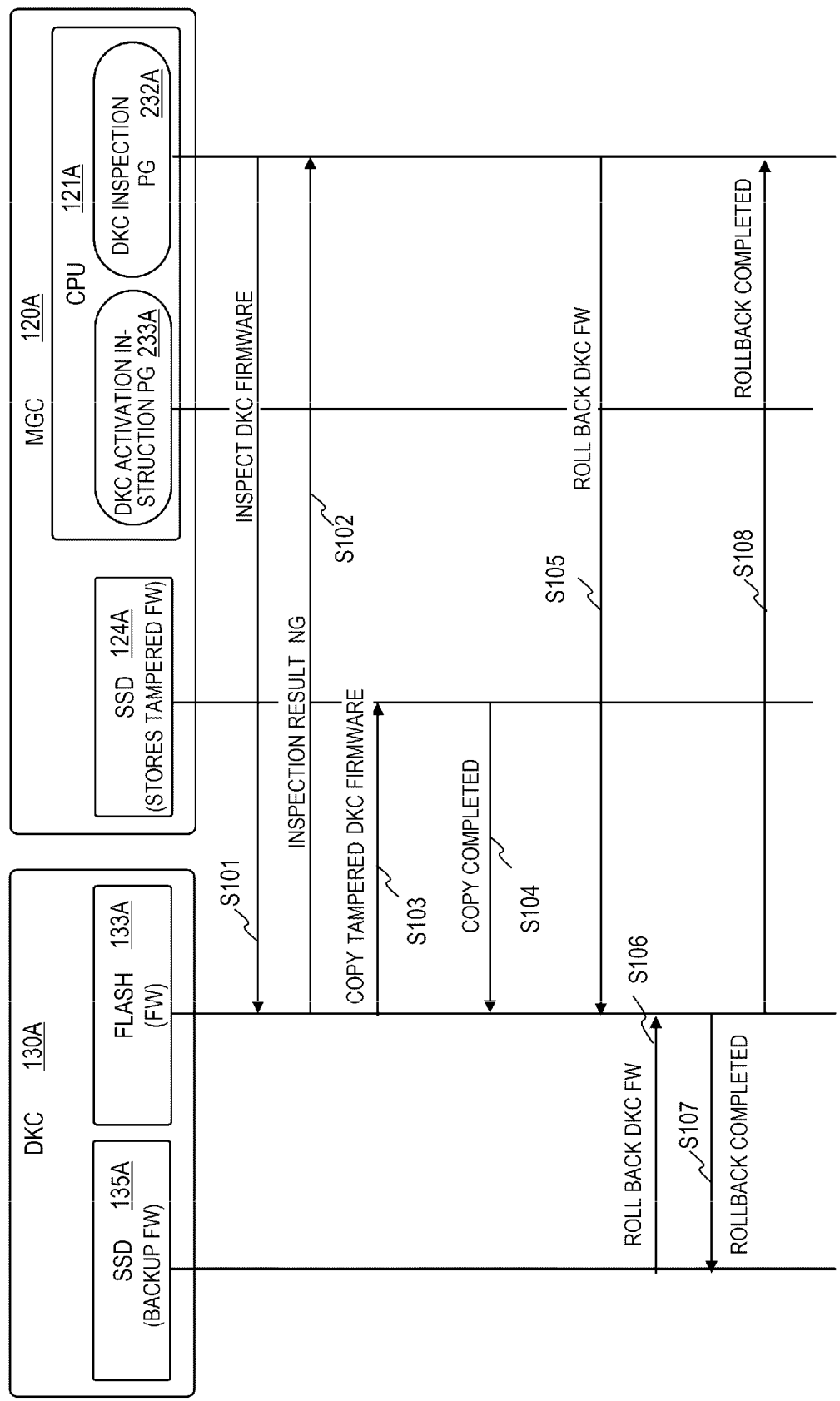
FIG. 16 illustrates a sequence diagram of a processing example when tampering is detected in initial phase tampering check of the disk controller.

FIG. 16 is a sequence diagram of a processing example when tampering is detected in the initial phase tampering check S74. The DKC inspection program 232A of the management controller 120A inspects the DKC firmware 250A stored in the flash memory 133A of the disk controller 130A (S101). When an inspection result indicates that there is a tampering (S102), the DKC inspection program 232A copies the tampered DKC firmware from the flash memory 133A to the SSD 124A of the management controller 120A (S103). Data on the management controller 120A at the time of subsequent analysis is easily collected. The tampered firmware may be stored in the SSD 134A of the disk controller 130A.

When the copy is completed (S104), the DKC inspection program 232A rolls back the DKC firmware 250A of the flash memory 133A according to backup firmware stored in the SSD 135A of the disk controller 130A (S105 and S106). The DKC inspection program 232A may instruct the flash memory 133A to roll back by a backup of the SSD 135A, or the CPU 131A of the disk controller 130A that received a request from the DKC inspection program 232A may update the DKC firmware 250A of the flash memory 133A.

The flash memory 133A returns the completion of the rollback of the DKC firmware 250A to the DKC inspection program 232A (S108).

In the above example, a backup of the DKC firmware 250A is held in the SSD 135A of the disk controller 130A. In another example, the backup may be stored in the SSD or the flash memory of the management controller 120A.

Figure 17:
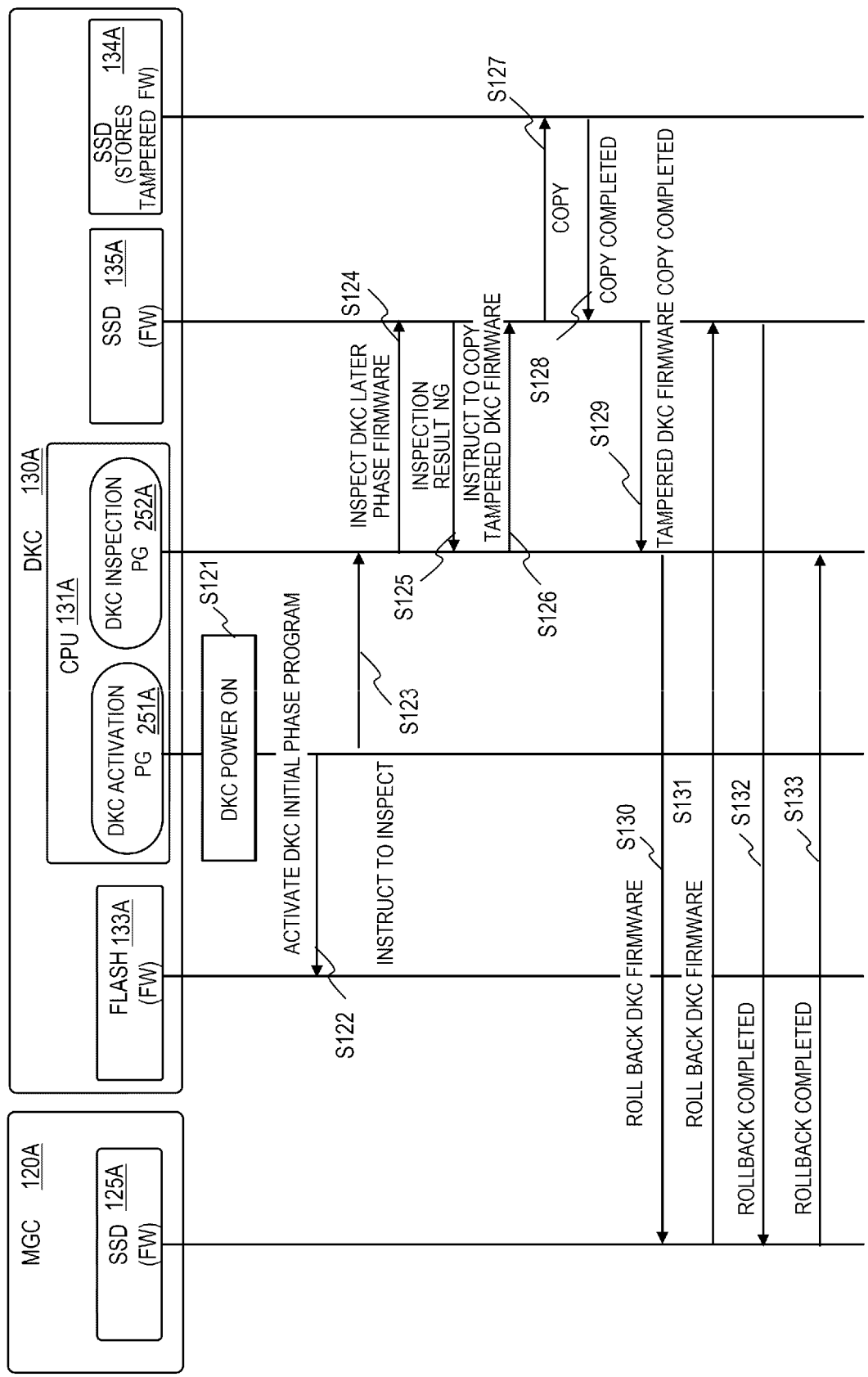
FIG. 17 illustrates a sequence diagram of a processing example when tampering is detected in later phase tampering check of the disk controller.

FIG. 17 is a sequence diagram of a processing example when tampering is detected in the later phase tampering check S76. The DKC initial phase activation program 251A turns on power of the disk controller 130 (S121). In addition, the DKC initial phase activation program 251A sequentially activates other programs of the DKC firmware 250A in the flash memory 133A (S122).

The activated DKC inspection program 252A inspects the DKC firmware 260A in the SSD 135A in response to an inspection instruction (S123) from the DKC initial phase activation program 251A (S124). When an inspection result indicates that there is a tampering (S125), the DKC inspection program 252A instructs the SSD 135 of the disk controller 130A to copy the tampered firmware to the SSD 134 (S126). The SSD 135A copies the tampered firmware to the SSD 134A (S127), and receives a completion response (S12).

When the DKC inspection program 252A receives, from the SSD 135A, the copy completion response of the tampered firmware (S129), the DKC inspection program 252A rolls back the DKC firmware 260A of the SSD 135 of the disk controller by a backup of the SSD 125 of the management controller 120A.

Specifically, the DKC inspection program 252A instructs the SSD 125A to copy the backup of the DKC firmware 260A (S130). The SSD 125A copies the backup of the DKC firmware 260A to the SSD 135A (S131). Upon receiving the copy completion response from the SSD 135A (S132), the SSD 125A returns a rollback completion response of the DKC firmware 260A to the DKC inspection program 252A (S133). The safety can be improved by using a backup of another controller.

The storage controller may execute periodic tampering check (inspection). Reliability after the activation of the storage controller can be maintained by the periodic tampering check. For example, the periodic tampering check is executed every time a predetermined period of time elapses after the activation of the storage controller.

A method of the tampering check is basically the same as the tampering check at the time of the activation described above. In the periodic check, the management controller executes processing independently of the input and output of the host data by the disk controller while the disk controller is operating. The input and output of the host data by the disk controller can be executed in parallel with the tampering check and the recovery by the management controller.

The management controller may take over processing of another management controller in which a fault occurred. For example, upon detecting a fault of the management controller 120B, the management controller 120A takes over the processing of the management controller 120B. A plurality of management controllers that can take over processing of one management controller may exist, and one management controller may take over processing of a plurality of fault management controllers.

The management controller 120A monitors a heartbeat signal from a management controller that is a monitoring target. Monitoring targets are illustrated, for example, in the monitoring target management table 340. The heartbeat signal can always monitor other management controllers.

The present invention is not limited to the above embodiment and includes various modifications. For example, the above embodiment has been described in detail for easy understanding of the present invention, and the present invention is not necessarily limited to those including all the configurations described above. A part of a configuration of one embodiment can be replaced with a configuration of another embodiment, and a configuration of one embodiment can be added to a configuration of another embodiment. In addition, a part of a configuration of each embodiment can be added, deleted, or replaced with another configuration.

Each of the above configurations, functions, processing units, or the like may be partially or entirely implemented by hardware such as design using an integrated circuit. In addition, each of the above configurations, functions, and the like may be implemented by software through means of a processor interpreting and executing a program for implementing respective functions. Information of programs, tables, files, or the like for implementing each function can be placed in a recording apparatus such as a memory, a hard disk, and a solid state drive (SSD), or a recording medium such as an IC card, an SD card, or the like.

Control lines and information lines show those considered to be necessary for the description, and not all the control lines and the information lines are necessarily shown on the product. Actually, it may be considered that almost all the configurations are connected to each other.

What is claimed is:

1. A storage system comprising:
a first storage controller; and
a second storage controller, wherein
the first storage controller includes a first input and output controller configured to input and output host data, and a first management controller,
the second storage controller includes a second input and output controller configured to input and output host data, and a second management controller,
the first management controller is configured to store a backup of software of at least one of the second storage controller or the first input and output controller,
a copy of tampered software of the at least one is stored, and
the tampered software of the at least one is recovered by the backup.

2. The storage system according to claim 1, wherein the tampered software is stored in a storage drive different from a storage drive storing the software before the tampering.

3. The storage system according to claim 1, wherein the backup is a backup of the software of the second storage controller.

4. The storage system according to claim 3, wherein the second storage controller is included in a storage node different from the first storage controller.

5. The storage system according to claim 3, wherein
the backup is a backup of the software of the second management controller, and
the first management controller is configured to recover the tampered software by the backup when normal activation of the second management controller cannot be confirmed.

6. The storage system according to claim 5, wherein
the second management controller is configured to inspect the recovered software.

7. The storage system according to claim 1, wherein
the backup is a backup of the software of the first input and output controller, and
the first input and output controller is configured to, when tampering of the software is detected,
store the tampered software in a storage drive of the first input and output controller, and
recover the tampered software by the backup.

8. A method for inspecting tampering of software in a storage system, wherein
the storage system includes
a first storage controller, and
a second storage controller,
the first storage controller includes a first input and output controller configured to input and output host data, and
a first management controller,
the second storage controller includes a second input and output controller configured to input and output host data, and a second management controller,
the first management controller is configured to store a backup of software of at least one of the second storage controller or the first input and output controller, and
the method comprises: by the storage system,
inspecting the software of the at least one;
storing a copy of the software of the at least one in which tampering is detected by the inspection; and
recovering the tampered software of the at least one by the backup.

* * * * *